UNITED STATES PATENT OFFICE.

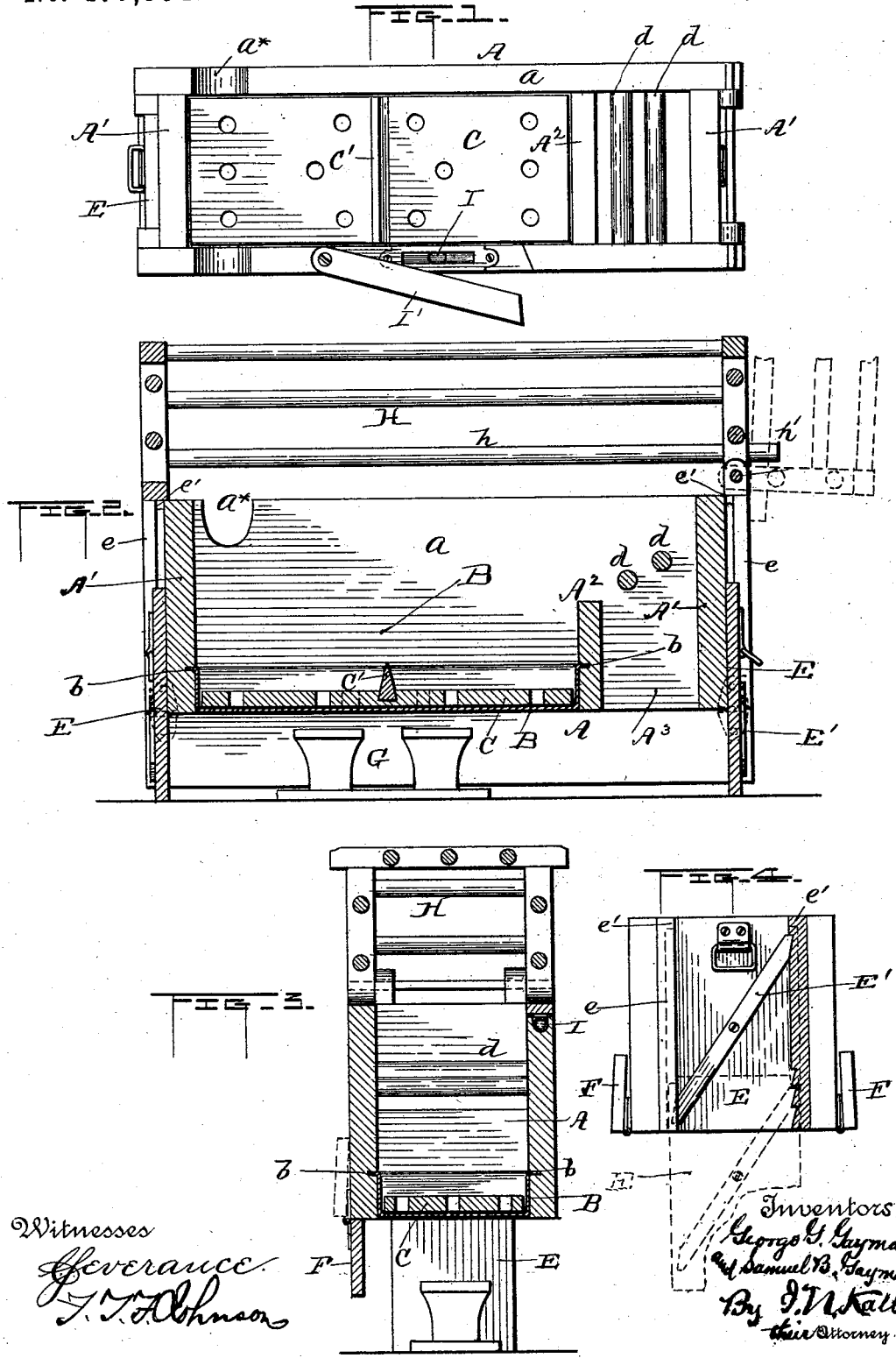

GEORGE G. GAYMAN AND SAMUEL B. GAYMAN, OF RACINE, PENNSYLVANIA.

COMBINED SHEEP BOX AND VAT.

SPECIFICATION forming part of Letters Patent No. 477,894, dated June 28, 1892.

Application filed December 9, 1891. Serial No. 414,481. (No model.)

*To all whom it may concern:*

Be it known that we, GEORGE G. GAYMAN and SAMUEL B. GAYMAN, citizens of the United States, residing at Racine, in the county of Washington and State of Pennsylvania, have invented certain new and useful Improvements in a Combined Sheep Box and Vat; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to bath boxes and vats for the cure of foot-rot in sheep, and has for its object the provision of a convenient and simple device in which the sheep may be placed and its feet subjected to treatment in a suitable fluid heated to a proper degree, which the supply of fresh air for breathing and keeping the body of the sheep at an equable temperature is not interrupted nor interfered with during the process.

In carrying our invention into practice we provide a box of proper size having a vat of metal or other indestructible material for containing a foot-rot cure, having a suitable metallic bottom, and being closed a suitable height on the sides and ends, and of sufficient size to permit the feet of the sheep to be supported without cramping or torturing the animal. The vat does not cover the entire bottom of the box, and a partial-height partition separates the vat from the remainder of the box, which is in front of the vat and is open at bottom to permit free circulation of air for the head of the sheep. Across this open space two or more bars may be placed to prevent lambs and small sheep from escaping. The metallic bottom in the vat is preferably made pan-shaped with its sides lying in line with the sides of the box and having flanges at the upper edge which take into the sides of the box. This construction elevates the joint between the metallic bottom and wooden walls to a sufficient height to take it away from the direct action of the heat of the lamp, while at the same time it does not give a heat-conducting surface on the sides of the sheep, as would be the case if the whole vat were made of metal.

In the vat a non-conducting platform is placed on which the sheep stands. This platform is provided with a central knife-edge cleat across the center, which prevents the sheep from standing on it, and thus avoiding the bath, while the cleat stiffens the platform and prevents warping. The platform is perforated to permit free circulation of the fluid.

The side walls of the vat at the rear are provided with depressions which permit the hands of the operators to be inserted for taking hold of the hind legs of the sheep, and also permits the said hind legs of the sheep to be drawn out without elevating them so high and thus slopping out the wash, as would be the case on level sides.

One side wall of the vat is provided with a spirit-level for equalizing the level of the wash in the vat, over which a guard is hinged.

Over the box a rack is hinged to turn down upon it lengthwise and confine the sheep in place while undergoing treatment. This rack is swung at one end of the box, preferably the end where the head of the sheep is placed, and turns down over the length of the sheep. The two lower bars of the rack may be extended past the corner-posts at the hinged end to afford stops for holding the rack in an upright position.

The ends of the box are provided with sliding supports or legs, which can be lowered to raise the box to any desired height from the ground or may be raised so as not to project below the lines of the box. One or both sides of the box may be provided with hinged door or doors, which can be turned down to protect the stove from drafts and confine the heat under the box. The end supports are preferably made solid for this same purpose.

An oil-stove or other suitable heating apparatus is placed beneath the metallic bottom of the vat to bring the fluid to the proper temperature.

The wash or fluid which we propose to use in the vat is that patented to us on the 8th day of September, 1891, No. 459,178; but we may use any other wash, if desired, with the present device.

The accompanying drawings illustrate our invention.

Figure 1 is a plan view. Fig. 2 is a longitudinal section. Fig. 3 is a transverse section taken through the vat. Fig. 4 is an end elevation with rack removed.

Similar letters of reference indicate corresponding parts in all the figures where they occur.

A is the box, having the side walls $a$ $a$, which have depressions $a^*$ near their rear ends to permit easy insertion of the hand and removal of the sheep's feet, as already described.

$A'$ $A'$ are the end walls of the box, and $A^2$ is the partial-height partition, which divides the vat portion B from the open portion $A^3$ of the box.

B is the metallic or other fire-proof pan-shaped bottom of the vat, whose sides coincide with the inside of the box-walls into which the top flange $b$ of the pan is inserted. In the pan a wooden or other non-conducting platform C is placed, which is provided with a central transverse knife-edge cleat $C'$, which prevents the sheep from standing on the cleat, while the cleat prevents warping. This platform is preferably perforated to permit free circulation of the fluid. Over the opening in the box in front of the vat two or more bars $d$ $d$ may be set transversely across the box to prevent small sheep or lambs from getting out.

The ends of the box are provided with sliding supports or legs E E, which are held in guides or ways $e$ $e$ on the sides and prevented from being pushed too far upward by stops $e'$ on said guides or ways. A pivoted lever or button $E'$ is secured to each leg, which takes into recesses on the sides of the guides to hold the legs in an elevated or lowered position. The legs or supports are preferably flat boards or pieces imperforate in structure, which enables them to serve as wind-guards to protect the stove and confine the heat under the vat. One or both sides of the box may be provided with hinged doors F, which can be turned down to further protect the stove and confine the heat beneath the pan. G is the stove or other heating means of any suitable form.

The guides or ways at one end of the box are extended up past the side walls and form studs or hinge-butts, to which one end of a rack H is pivoted. The rack H is made of open slats or bars and is of the same length and width as the box and of sufficient height to fit over the back of a sheep comfortably. The lower longitudinal bars $h$ $h$ of the rack extend beyond the corner-posts at the pivoted end, as shown at $h'$ $h'$, and form stops to hold the rack in elevated position, as shown in dotted lines, Fig. 1.

On the top of one of the side walls of the box a spirit-level I is placed to enable the exact adjustment of the box to make the fluid stand the same height all over the vat. Over the spirit-level a guard or cover $I'$ is hinged or pivoted to allow ready access to and protection of the spirit-level.

Having thus described our invention, what we claim, and desire to secure by Letters Patent, is—

1. A combined box and vat for the purpose described, consisting of the box-walls A A $A'$ $A'$, a fire-proof pan B, covering a portion of the bottom of said box and forming the vat, a partial-height partition $A^2$ at the front of the vat, and an open space between said partition and one end wall of the box, as set forth.

2. A device for cleaning sheep's feet, consisting of the box-walls, as described, having adjustable supports at the ends thereof, a partial-height partition, and a pan-bottom covering the space between one end wall and the partial-height partition, an open space between the partial-height partition and the other end wall, and bars across said open space, as set forth.

3. A sheep-box consisting of the side walls A A, the end walls $A'$ $A'$, a partial-height partition $A^2$, and a fire-proof pan B, having a flange $b$ all around the top thereof inserted in a groove or channel in one end wall, the side walls, and the partial-height partition, as set forth.

4. A sheep-box consisting of the walls A A $A'$ $A'$, a partial-height partition $A^2$, a fire-proof pan B, forming a bottom for the box between one end wall and the partial-height partition, and the open rack hinged to the top of the box at one end, as set forth.

5. A box for treating sheep's feet, consisting of the box-walls having a fire-proof pan and partial-height partition forming a vat, adjustable supports at the ends of said box, and a hinged door or doors on the side or sides of said box, as set forth.

6. A box for treating sheep's feet, consisting of the side walls A A, having notches or cut-away portions, as described, at one end thereof, the end walls $A'$ $A'$, the partial-height partition $A^2$, and a fire-proof pan B, and a hinged rack on top of the box, as set forth.

In testimony whereof we affix our signatures in presence of two witnesses.

GEORGE G. GAYMAN.
SAMUEL B. GAYMAN.

Witnesses:
J. STOG. SMITH,
C. H. SMITH.